United States Patent [19]

Imai et al.

[11] Patent Number: 4,887,103
[45] Date of Patent: Dec. 12, 1989

[54] IMAGE FORMING APPARATUS AND DEVELOPING DEVICE THEREOF

[75] Inventors: Nobuhiro Imai, Kawasaki; Fumio Asano, Noda, both of Japan

[73] Assignee: Canon Kabushiki Kaisha, Tokyo, Japan

[21] Appl. No.: 340,788

[22] Filed: Apr. 20, 1989

[30] Foreign Application Priority Data

Apr. 23, 1988 [JP] Japan .................................. 63-101176

[51] Int. Cl.⁴ ............................................. G01D 15/00
[52] U.S. Cl. .................................. 346/160.1; 346/153.1
[58] Field of Search ............ 346/153.1, 160.1, 139 C; 400/119; 358/300; 355/3 TE, 3 DD

[56] References Cited

U.S. PATENT DOCUMENTS

| | | | |
|---|---|---|---|
| 3,816,840 | 6/1974 | Kotz | 346/74.2 |
| 3,879,737 | 4/1975 | Lunde | 346/160.1 |
| 3,914,771 | 10/1975 | Lunde | 346/74.2 |
| 4,268,598 | 5/1981 | Leseman et al. | 346/160.1 |
| 4,573,061 | 2/1986 | Fujii et al. | 346/153.1 |
| 4,635,074 | 1/1987 | Young | 346/153.1 |
| 4,739,348 | 4/1988 | Ando et al. | 346/160.1 |
| 4,755,837 | 7/1988 | Schmidlin | 346/160.1 |
| 4,810,604 | 3/1989 | Schmidlin | 346/153.1 |

Primary Examiner—Arthur G. Evans
Attorney, Agent, or Firm—Fitzpatrick, Cella, Harper & Scinto

[57] ABSTRACT

An image forming apparatus which employs a recording method that uses electrically conductive developer, and a developing device for use in the image forming apparatus. A magnetic field is generated in an area having a width larger than that of a group of electrodes at the position of the electrode group so as to prevent the developer which has been passed over the electrodes from flowing outside of an image area at the downstream side of the group of electrodes.

12 Claims, 6 Drawing Sheets

IMAGE FORMING APPARATUS AND DEVELOPING DEVICE THEREOF

BACKGROUND OF THE INVENTION

1. Field of the Invention

The present invention relates to an image forming apparatus for displaying an image output from a computer or the like, and more particularly, it concerns such apparatus in which a developer is electrostatically attached to a recording medium to form an image.

2. Description of the Related Art

The above-described type of image forming apparatus has been proposed in, for example, the specifications of U.S. Pat. Nos. 3,879,737, 3,914,771, 4,268,598 and 4,573,061. In the image forming apparatus described in those patents, developing agent 108 as shown in FIG. 6A is concentrated on recording electrodes 101 (FIG. 6B) by concentrating the magnetic flux of a magnetic field generated by an inner rotary magnet member 104 on the recording electrodes 101 by virtue of the presence of a magnetic member 102 made of a magnetic material. The magnetic member 102 is provided on a developing sleeve 105 that constitutes an outer cylindrical member surrounding the rotary magnet member 104. One end portion of the magnetic member 102 is located on the outer side of the developing sleeve 105 and extends in the radial direction thereof.

Further, the developing agent 108 supplied onto the developing sleeve 105 is reserved in a container 106, as shown in FIG. 6A. The amount of developing agent 108 supplied is restricted by a wall-shaped member 107 that forms part of the container 106.

In the above-described apparatus, the group of electrodes 101, together with the magnetic member 102, must be fixed to the outer cylindrical member of the developing sleeve 105. Accordingly, it is very difficult to manufacture a group of electrodes that can cope with an image having an extended width. In order to concentrate the magnetic flux, the magnetic member 102 has to be elongated in the radial direction of the developing sleeve 105, and a supporting member 110 must be provided on the sides of the magnetic member 102 in order to ensure mounting strength and the adherence of the electrodes, as shown in FIG. 6B.

Further, it is impossible to prevent the developing agent from flowing out through the ends of a gap formed between the electrodes and an associated recording medium at the location where the distance between the electrodes and the recording medium is the shortest.

SUMMARY OF THE INVENTION

The present invention is directed to overcoming the aforementioned problems of the prior techniques and to preventing the developing agent from flowing out of the ends of the gap between the electrode group and the recording medium at the downstream side of the electrode group.

The present invention in one aspect provides a novel image forming apparatus in which an image is formed on a recording medium by means of a developer which passes a group of electrodes. The novel image forming apparatus comprises a magnetic field generating means, a developer conveying member, a recording medium and a group of recording electrodes. The developer conveying member is arranged so as to be movable in an image movement direction relative to the magnetic field generating means; and the recording medium is provided in opposed relation with the developer conveying member. The group of recording electrodes is located at a position of shortest distance between the developer conveying member and the recording medium and the group of recording electrodes is arranged in a direction transverse to the image movement direction. The developer is brought into contact with the side of the group of recording electrodes which is closer to the medium by the magnetic force generated by the magnetic field generating means. The length of the group of recording electrodes in a direction transverse to the image movement direction is less than the length of the magnetic field generating means. The group of recording electrodes is located between the ends of the magnetic field generating means and the magnetic field generating means in turn is located between the opposite edges of the developer conveying member in a direction transverse to the image movement direction.

In a more specific aspect, the present invention provides an image forming apparatus which includes an inner magnet member and an outer developer conveying member called a developing sleeve which rotate relative to each other in a direction of image movement, a group of recording electrodes provided on the developer conveying member in a direction transverse to the direction of image movement, a recording medium that approaches the recording electrodes, electrically conductive magnetic developer conveyed by the developer conveying member, and an electrical circuit for supplying a recording voltage to the recording electrodes. The image forming apparatus is characterized in that the length of the group of electrodes in a direction transverse to the direction of image movement is made shorter than the length, in the same transverse direction, of the inner magnet member, in that the opposite edges of the group of recording electrodes are located between the opposite ends of the magnetic member, and in that the opposite ends of the magnetic member are located between the opposite edges of the developer conveying member in a direction transverse to the direction of image movement.

The prevent invention in a further aspect provides an image forming apparatus which is characterized in that the recording electrode group has a shoulder that rises from the surface of the developer conveying member at the opposite end portions thereof which are displaced from each other in a direction transverse to the direction of image movement.

DETAILED DESCRIPTION OF THE PREFERRED EMBODIMENTS

Figure 1:
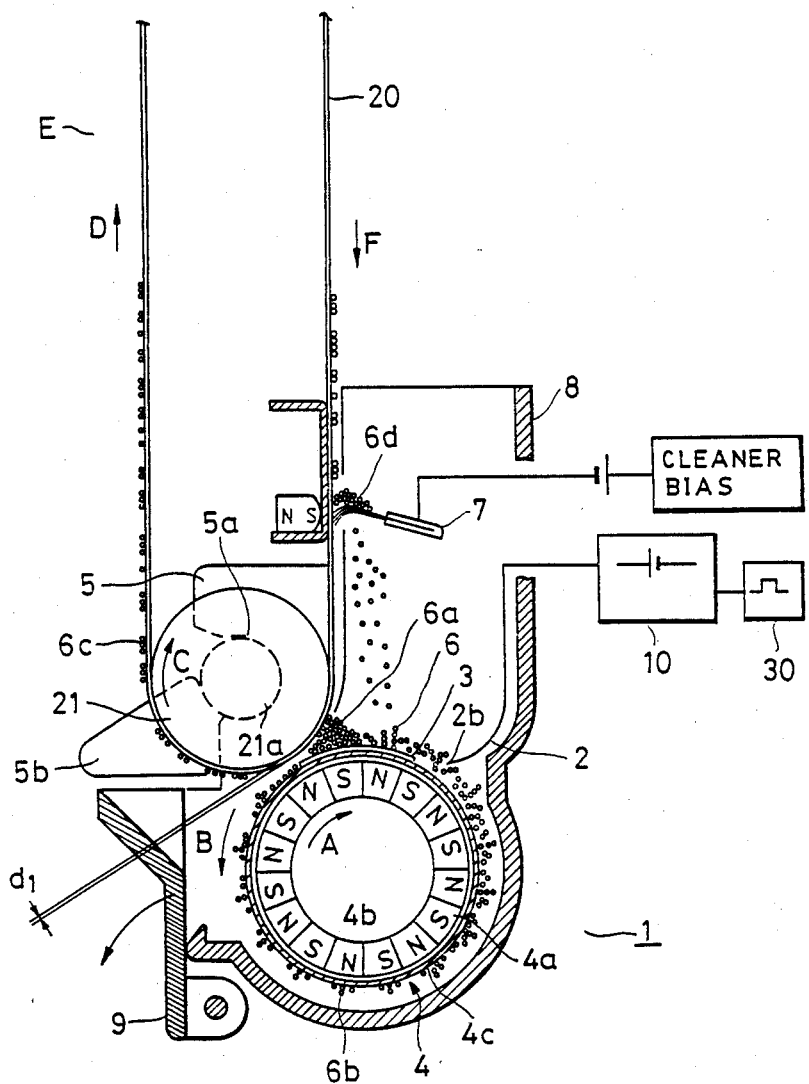
FIG. 1 is a schematic section view, in elevation, of the developing portion of an image forming apparatus embodying the present invention.

An embodiment of the present invention will now be described with reference to FIGS. 1 to 4. A developing apparatus 1 includes a recording electrode sheet 2, in the form of a flexible printed circuit board 2, which is adhered by a hot-melt adhesive to a supporting member 3 made of a non-magnetic material such as an aluminum plate. A developing sleeve 4 is provided for conveying and supplying developer 6 onto recording electrode portions 2a of the sheet 2 that form exposed portions where copper foil in the recording electrode sheet 2 is exposed. A side plate 5 (FIG. 1) engages and supports a shaft supporting portion 21a of a lower roller 21 which moves a belt-like image bearing recording medium 20 in a given direction through the apparatus. A cleaner 7 is provided for scraping developer 6d from the recording medium 20 and returning it onto the developing sleeve 4 so that it can be used again to record an image on the recording medium 20. A developing container 8 forms a bottom and rear cover of the developing apparatus and cooperates with a front cover 9. A recording control portion 10 is provided for supplying recording voltages to the recording electrode portions 2a in response to image data pulses from an image input device 30, such as an image scanner or a computer. Checking members 11 (FIGS. 2 and 3) are provided for supplying the developer 6 conveyed by the developing sleeve 4 onto the recording electrode portions 2a without allowing any to be diffused in the transverse direction of image movement.

Figure 4A:
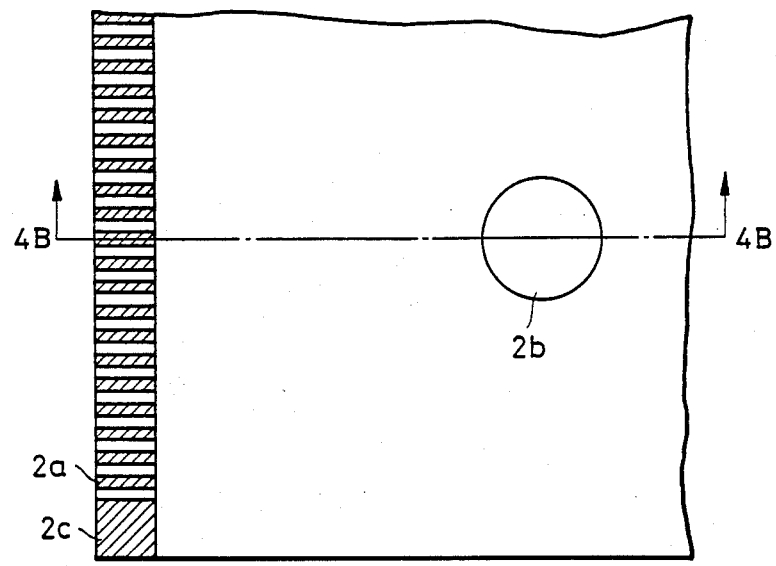
FIG. 4A is a plan view of recording electrode sheet of FIG. 2 and a supporting member therefor.
Figure 4B:
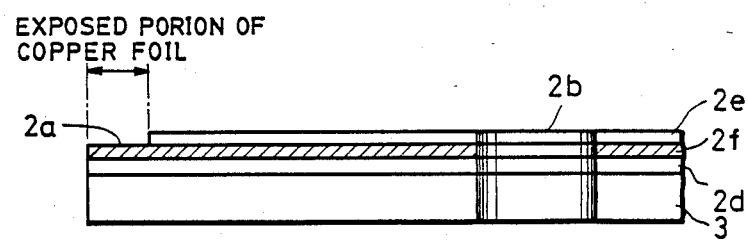
FIG. 4B is a section taken along the line 4B—4B of FIG. 4A.

As shown in FIGS. 4A and 4B, the recording electrode sheet 2 has a three-layer structure, which is generally similar to the structure of a flexible printed circuit board (a flexible substrate). In this three-layer structure, copper foil layers 2f are interposed between an insulation base film layer 2d and a cover film 2e (generally made of a polyimide resin). Part of each copper foil layer 2f is exposed to form a recording electrode portion 2a of the image forming apparatus according to the present invention.

In the developing sleeve 4 (FIG. 1), a shaft member 4b with a magnet member 4a formed on its outer periphery is supported on the inner side of a cylindrical member 4c made of a non-magnetic material, such as stainless steel, by a flange (not shown) in such a manner as to allow it to be rotated by a driving device (not shown). The flange, which also supports the cylindrical member 4c, is supported by the side plate 5.

A dimension d representing the shortest distance between the recording medium 20 and the recording electrode portions 2a is set to 300 $\mu m$ (micrometers) or less in this embodiment. A lower roller shaft supporting portion 5a of the side plate 5 may be made to be movable away from and toward the recording electrode portions 2a. Conversely, the developing sleeve 4 and the supporting member 3 for the recording electrode sheet 2 may be made to be movable away from and toward the lower roller shaft supporting portion 5a. A locking member 5b is provided on the side plate 5 to prevent the lower roller shaft supporting portion with the lower roller 21 mounted thereon from becoming inadvertently.

The developer 6 is supplied from a developer supplying device (not shown) located near the front cover 9 onto the surface of the cylindrical member 4c of the developing sleeve 4, the developer supplying device not necessarily being included in the image forming apparatus according to the present invention. The developer 6 supplied onto the cylindrical member 4c is conveyed on the surface of the cylindrical member 4c as it moves in the direction indicated by the arrow B (i.e., the direction of image movement) as the magnet member 4a is rotated in the opposite direction as indicated by the arrow A. The developer 6 then passes up through developer conveying holes 2b formed in the recording electrode sheet 2, and is thus supplied onto the recording electrode portion 2a, in the manner disclosed in the specification of U.S. Pat. No. 4,739,348, the disclosure of which is incorporated herein by reference. Since the shortest distance between the recording medium 20 and the recording electrode portion 2a is set to 300 $\mu m$ or less, the developer 6 gathers in this very narrow space to form a pile 6a, as shown in FIG. 1. The formation of this pile of developer is effective in reducing the number of voids in vertical chains of developer particles 6 formed by the magnetic flux of the magnetic field generated by the magnet member 4a, thereby increasing the apparent density and, hence, decreasing the apparent resistance of the developer. This enables a thick, vivid image to be formed at a low recording voltage, e.g., at 30 V (volts) or less in this embodiment.

When a predetermined recording voltage is supplied to the recording electrode portions 2a by the recording control portion 10 in response to the image data pulses generated by the image input device 30 such as an image scanner or a computer, charge is supplied to the electrically conductive developer 6. In consequence, when the vertical chains of charged developer particles 6 make contact with a dielectric layer formed on the recording medium 20, they cause the dielectric layer of the recording medium 20 to be charged to a polarity opposite to that of the developer 6, as is disclosed in the specification of U.S. Pat. No. 3,816,840, resulting in the adherence of the developer 6 onto the recording medium 20 as an image 6c. The electrically weak portions of the vertical chains of the developer particles 6 are unnecessary for the development conducted at that time and are removed from the recording medium 20 by the magnetic force generated by the magnet member 4a. This removed developer, which is shown at 6b, is separated from the recording medium 20 by the thickness of a shoulder h (FIG. 2) so that it does not disturb the image 6c formed thereon. The thus removed developer is then carried along the surface of the cylindrical member 4c of the developing sleeve 4. The shoulder h is formed along the downstream edge of the supporting member 3 of the recording electrode sheet 2.

The recording medium 20 is moved upwardly in the direction indicated by the arrow D (FIG. 1) by the frictional driving force of the lower roller 21 which rotates in the direction indicated by the arrow C so as to move the image 6c to a display region E and thereby present it as a display. After the image has been displayed, the recording medium 20 is turned and is moved downwardly in the direction indicated by the arrow F. The developer that formed the displayed image is removed from the surface of the recording medium 20 by a cleaner 7 which consists of a brush that slides against the surface of the recording medium 20. The removed developer falls in a developer container in the developing apparatus, as shown in FIG. 1, and is returned on the developing sleeve 4a for reuse.

Figure 2:
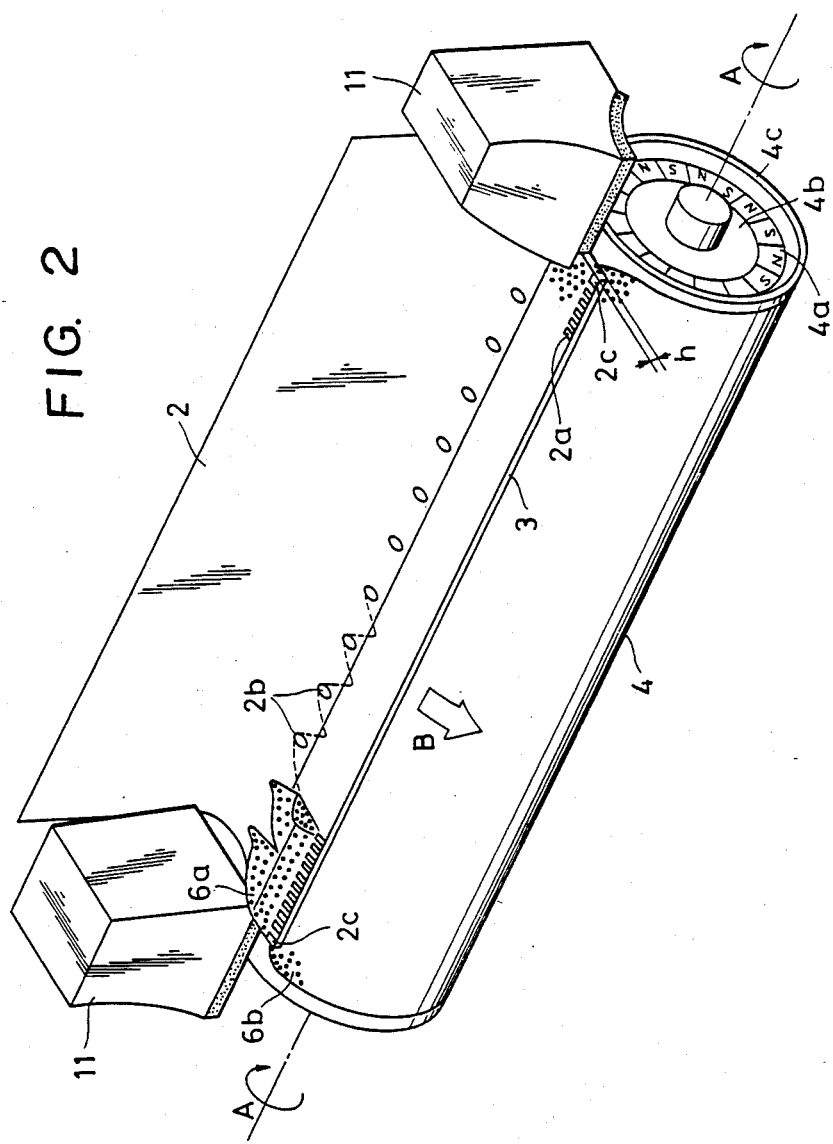
FIG. 2 is a perspective view of a recording electrode sheet with a group of recording electrodes and an associated developing sleeve forming a portion of the developing device in the image forming apparatus of FIG. 1, and illustrating a function of preventing developer from flowing out through two end portions of the recording electrode group in the transverse direction movement in the apparatus.
Figure 3:
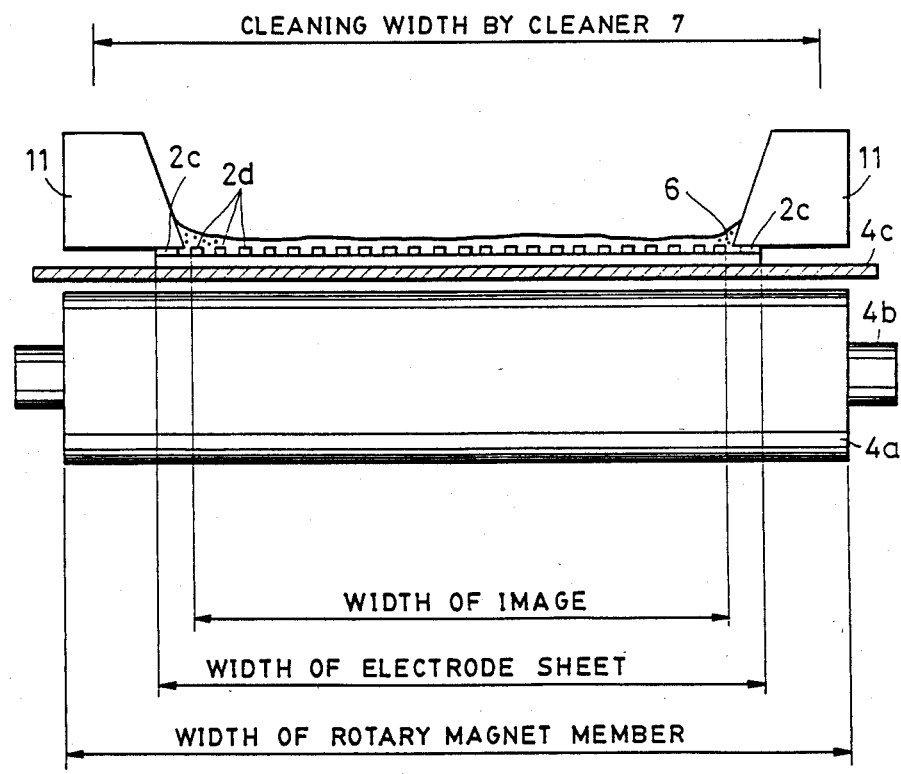
FIG. 3 is a fragmentary elevational view of the elements of FIG. 2, showing the relationship between the dimensions provided in the developer flow-out preventing function according to the present invention.

The developer 6 which passes up through the developer conveying holes 2b in the recording electrode sheet 2 is conveyed toward the recording electrode portion 2a while being restricted so as not to flow out in the transverse direction of image movement by the checking members 11 provided at the two sides of the recording electrode portions 22. The developer 6, however, moves out beyond the width of an image in the narrow space formed in the vicinity of a point at which the distance between the recording medium 20 and the recording electrode portions 2a becomes the shortest, as shown in FIG. 2. The outward flow of developer occurs because its movement cannot be blocked by the electrically grounded electrode portions 2c that form opposite edge portions of the recording electrode sheet 2. However, a non image forming area formed at the opposite edge electrode portions 2c of the recording electrode sheet 2 and the shoulder h formed in the circumferential direction of the developing sleeve 4 block the further diffusion of the developer which has flown outward in the narrow space; and the blocked developer falls at the shoulder h onto the sleeve due to the rotary magnet member 4a. The rotary magnet member 4a is made longer than the shoulder portion and thereby prevents the blocked developer from being scattered in the transverse direction of image movement.

As will be understood from the foregoing description, with the present invention, it is possible to prevent the developer from being scattered from the narrow space formed in the vicinity of a point at which the distance between the recording medium and the recording electrodes becomes the shortest and to prevent scattering of the developer from the downstream side of that space.

Figure 5:
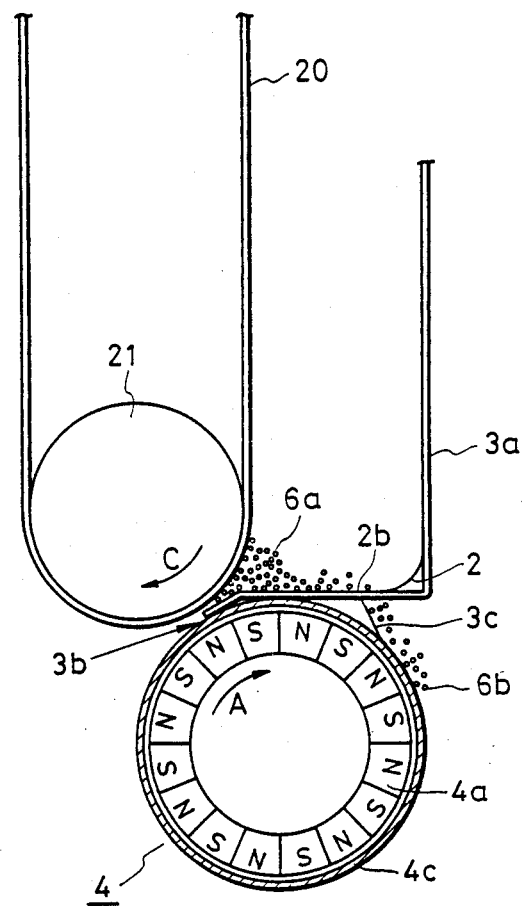
FIG. 5 is view similar to FIG. 1 but showing another embodiment of the invention.
Figure 6A:
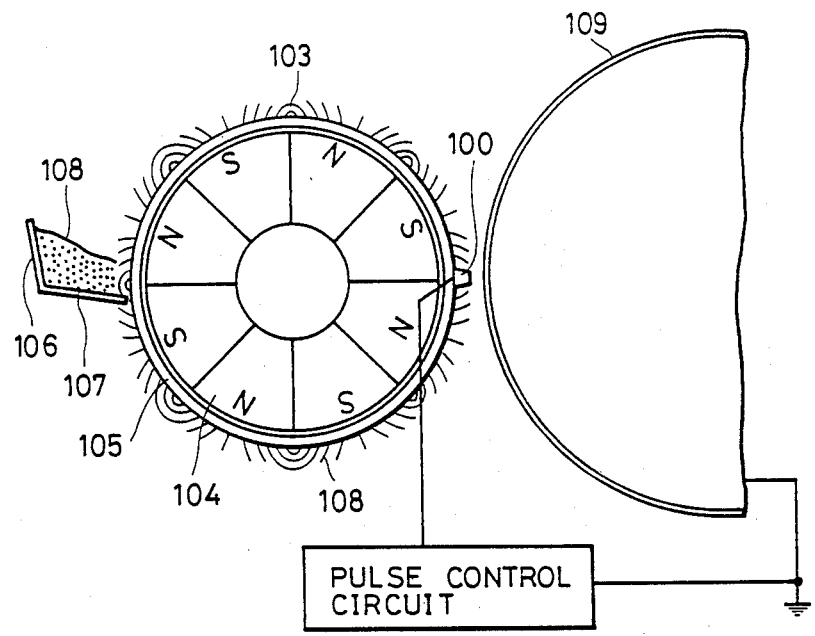
FIG. 6A is a schematic, cross sectional view of a developing device in a conventional image forming apparatus.
Figure 6B:
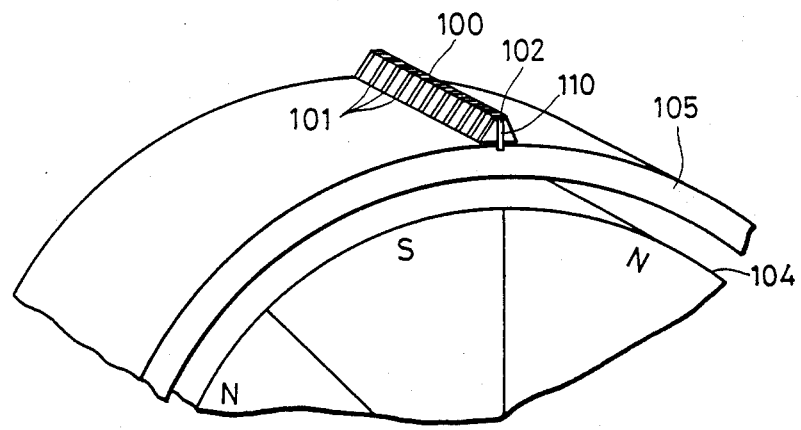
FIG. 6B is a fragmentary perspective view of the recording electrode portion of the developing device of FIG. 6A.

The embodiment shown in FIG. 5 is similar to that shown in FIGS. 1–4 except that in FIG. 5 the supporting member 3 for the recording electrode sheet 2 is shaped in a more rectangular configuration and is provided with a downwardly slanting flange portion 3b at the location where the developer 6a is transferred to the recording medium 20.

In addition, there are provided flange guides 3c between the underside of the supporting member 3 and the outer surface of the developing sleeve 4 to assist in preventing the developer from escaping in a direction transverse to the direction of movement of the sleeve.

What is claimed is:

1. An image forming apparatus in which an image is formed on a recording medium by means of developer which passes a group of electrodes, comprising:
   a magnetic field generating means and a developer conveying member provided around said magnetic field generating means in an arrangement so as to be movable in an image movement direction relative to said magnetic field generating means for supporting and conveying electrically conductive, magnetic developer;
   a recording medium provided in opposed relation with said developer conveying member for recording; and
   a group of recording electrodes located at a position of shortest distance between said developer conveying member and said recording medium, said group of recording electrodes being arranged in a direction transverse to said image movement direction, wherein said developer is brought into contact with the side of said group of recording electrodes which is closer to said recording medium by the magnetic force generated by said magnetic field generating means,
   the length of said group of recording electrodes in a direction transverse to said image movement direction is less than the length of magnetic poles of said magnetic field generating means in said transverse direction, said group of recording electrodes being located between the ends of said magnetic field generating means, and said magnetic field generating means being located between the opposite edges of said developer conveying member in a direction transverse to said image movement direction.

2. An image forming apparatus according to claim 1, wherein said magnetic field generating means has a rotary magnet, wherein said developer conveying member is non-magnetic and has a cylindrical sleeve-like shape, and wherein said recording electrodes are positioned on the surface of said conveying means.

3. An image forming apparatus according to claim 2, wherein a shoulder is formed on the downstream side of said recording electrodes a position at which said recording electrodes face said recording medium, said shoulder providing an increase in the distance between said developer conveying means and said recording medium.

4. An image forming apparatus according to claim 2, wherein a checking member having a height larger than that of said recording electrodes is provided on each of the opposite edges of said group of recording electrodes in a direction transverse to the direction of image move so as to restrict the movement of said developer in said direction.

5. An image forming apparatus according to claim 2, wherein said group of recording electrodes has grounded electrodes at the two opposite edge portions thereof over which said developer are conveyed.

6. An image forming apparatus according to claim 2, wherein said recording medium is arranged to display a visible image recorded by said developer.

7. An image forming apparatus according to claim 2, further including means arranged to remove the developer adhered on said recording medium for reuse after it has been used to display an image.

8. A developing apparatus for use in recording in which developer is conveyed over the surface of a group of electrodes and is then adhered onto a recording medium located in opposed relation with said group of electrodes, comprising:
   a magnetic field generating means;
   a developer conveying member provided around said magnetic field generating means in such a manner as to be movable in an image movement direction relative to said magnetic field generating means for supporting electrically conductive, magnetic developer; and a group of recording electrodes arranged in a direction transverse to said image movement direction, said developer conveying member being arranged such that said developer is brought over the surface of said recording electrodes by the magnetic force generated by said magnetic field generating means, the length of said group of recording electrodes in said direction transverse to said image movement direction is less than the length of said magnetic field generating means in the same direction, the two opposite edges of said group of recording electrodes in said direction transverse to said image movement direction being located between the ends of said magnetic field generating means, and said magnetic field generating means being located between opposite edges of said developer conveying member in said direction transverse to said image movement direction.

9. An image forming apparatus according to claim 8, wherein said magnetic field generating means has a rotary magnet, wherein said developer conveying means is a nonmagnetic member having a cylindrical sleeve-like shape, and wherein said recording electrodes are positioned on the surface of said conveying means.

10. An image forming apparatus according to claim 9, wherein a checking member having a height larger than that of said recording electrodes is provided on each of the opposite edges of said group of recording electrodes so as to restrict the movement of said developer in said direction transverse to said image movement direction.

11. An image forming apparatus according to claim 9, wherein said group of recording electrodes have grounded electrodes at opposite edge portions thereof.

12. An image forming apparatus according to claim 8, wherein said group of recording electrodes is provided with a shoulder that drops at the downstream side thereof in the direction in which said developer is moved.

* * * * *

UNITED STATES PATENT AND TRADEMARK OFFICE
CERTIFICATE OF CORRECTION

PATENT NO. : 4,887,103

DATED : December 12, 1989

INVENTOR(S) : Imai et al.

It is certified that error appears in the above-identified patent and that said Letters Patent is hereby corrected as shown below:

Drawings

SHEET 4,
FIG. 4B, change "PORION" to --PORTION--.

COLUMN 2,
Line 9, change "the medium" to --the recording medium--; and
Line 44, change "prevent" to --present--.

Signed and Sealed this

Thirteenth Day of August, 1991

Attest:

HARRY F. MANBECK, JR.

Attesting Officer     Commissioner of Patents and Trademarks